United States Patent [19]  [11]  4,199,447
Chambers et al.  [45]  Apr. 22, 1980

[54] COALESCENCE OF OIL IN OIL/WATER EMULSIONS

[75] Inventors: David B. Chambers, Cheadle Hulme; Barry Walker, Harrogate, both of England

[73] Assignee: Imperial Chemical Industries Limited, London, England

[21] Appl. No.: 745,813

[22] Filed: Nov. 29, 1976

Related U.S. Application Data

[63] Continuation of Ser. No. 557,933, Mar. 13, 1975, abandoned.

[51] Int. Cl.$^2$ .............................................. B01D 13/00
[52] U.S. Cl. .................................... 210/23 R; 210/36; 210/40; 210/DIG. 5; 210/DIG. 26
[58] Field of Search .......... 210/23 R, 36, 40, 242 AS, 210/502, 504, 505, DIG. 5, DIG. 26; 428/372, 373, 374, 378

[56] References Cited

U.S. PATENT DOCUMENTS

| | | | |
|---|---|---|---|
| 3,562,153 | 2/1971 | Tully et al. | 210/36 |
| 3,679,541 | 7/1972 | Davis et al. | 428/373 |
| 3,779,908 | 12/1973 | Gregory | 210/23 R |
| 3,800,945 | 4/1974 | Fowler | 210/505 |
| 3,862,963 | 1/1975 | Hoshi et al. | 210/502 |
| 3,865,732 | 2/1975 | Terhune et al. | 210/23 R |

*Primary Examiner*—Charles N. Hart
*Assistant Examiner*—Ivars Cintins
*Attorney, Agent, or Firm*—Cushman, Darby & Cushman

[57]  ABSTRACT

This invention relates to a method for the removal of oil from an oil in water emulsion by passing the emulsion through a fibrous structure comprising fibres having finely divided particles having an average size of one micron or less and which exhibit oleophilic and hydrophobic properties adhered to and penetrating their outer surfaces, and removing the coalesced oil droplets so formed.

5 Claims, No Drawings

COALESCENCE OF OIL IN OIL/WATER EMULSIONS

This is a continuation of application Ser. No. 557,933 filed Mar. 13, 1975, now abandoned.

The present invention concerns the removal of oil from an oil in water emulsion.

According to the present invention we provide a method for the removal of oil from an oil in water emulsion which comprises passing the emulsion through a fibrous structure comprising fibres having finely divided particles which exhibit oleophilic and hydrophobic properties penetrating their outer surfaces, and removing the coalesced oil droplets so formed.

The fibres, e.g. continuous filaments of staple fibres, may be homofibres to which the particles have been caused to adhere and penetrate their surfaces by subjecting the homofibres to surface heat and/or plasticiser treatment(s). Alternatively, the fibres may be homofibres with a nonfibre forming resinous or polymeric coating thereon, which coating when subjected to heat and/or plasticiser treatment(s) and having particles applied thereto allows them to penetrate and adhere.

Most desirably, however, the fibres are conjugate fibres. By the expression "conjugate fibre" is meant a spun, especially a melt spun, fibre (i.e. a continuous filament or a staple fibre) composed of at least two fibre-forming polymeric components arranged in distinct zones across the cross-section of the fibre and substantially continuous along the length thereof, and wherein one of the components has a melting temperature significantly lower than the melting temperature(s) of the other components and is located so as to form at least a portion of the peripheral surface of the fibre.

Therefore, according to a preferred embodiment of the invention, the method utilizes a fibrous structure comprising oriented, conjugate fibres (as hereinbefore defined), the component of lower melting temperature having finely divided particles which exhibit oleophilic and hydrophobic properties penetrating its outer surface.

Conjugate fibres having two components are preferred. The most preferred type of bicomponent fibre is one wherein a component of low melting temperature forms a sheath about another component serving as a core; although a bicomponent fibre wherein a component of low melting temperature is one of two components arranged side-by-side may also be used.

The polymeric material of the low melting point component has a melting point at least 10° C., preferably at least 20° C., below that of the other component of the fibre.

The fibrous structure may be in the form of a knitted fabric, a woven fabric or a non-woven fabric, the latter being preferred. Particularly desirable fibrous structures are melded fabrics produced from staple fibres or oriented, i.e. drawn, sheath/core heterofilaments. Such melded fabrics may either be point-bonded or area-bonded. Any one fibrous structure may comprise more than one layer of fabric.

The preferred particles are silane-coated silica particles, although other particles which exhibit the combined properties of oleophilicity and hydrophobicity may be used. The average size of particle is preferably at least 0.1 micron. The "average size of particle" indicates the largest cross-sectional dimension of a particle, e.g. the diameter in the case of a spherical particle. Most desirably the particles have an average size of one micron or less.

The degree of hydrophobicity of the fibres should be such that the fibrous structure effects a water contact angle of at least 110° and preferably greater than 140°. The magnitude of the contact angle is largely dependent on the type of hydrophobic particles used and its concentration per unit area at the surface of each fibre. The oleophilic nature of the particles exposed on the fibres is such that the oil comes into contact with, and temporarily adheres to, the particles and the oil droplets then coalesce and pass through the fibrous structure. The process is thought to be enhanced by the surface roughness of the fibres due to the presence of the particles.

The porosity of the fibrous structure is chosen such that the probability of the oil particles contacting the fibres is as high as possible without creating too high a pressure drop across the fibrous structure. Of the preferred fibrous structures, point-bonded melded fabrics, being more tightly packed, have a much higher pressure drop than area-bonded melded fabrics. With both point-bonded and area-bonded melded fabrics, the pressure drop is usually less than 50 cm of water at hydraulic flows up to 16 $m^3$ per hour per square meter of fabric. However the pressure drop will increase above this figure as the hydraulic flow and/or oil throughput is increased.

By "point-bonded melded fabric" we mean a fabric in which the fibres have small discrete regions in which the fibres are strongly adhesively bonded to each other, which regions are separated from each other by less strongly bonded, or even unbonded, regions.

By "area-bonded melded fabric" we mean a fabric the fibres in which are adhesively bonded to each other at substantially all cross-over points throughout the thickness and over the whole area of the material.

Particularly efficient fibrous structures are those comprising two or more superimposed area-bonded melded fabrics followed by one or more point-bonded melded fabrics. With a fibrous structure comprising three superimposed area-bonded melded fabrics followed by a superimposed point-bonded melded fabric it is possible to achieve in excess of 97% and sometimes in excess of 99% reduction in oil concentration, after allowing sufficient time, for example 4 to 8 minutes for gravimetric separation of the coalesced oil droplets, by a single pass through the fibrous structure at hydraulic flows up to 9.2 $m^3$ per hour per square meter of fabric.

With other fibrous structures such as two superimposed area-bonded melded fabrics followed by a superimposed point-bonded melded fabric or two superimposed area-bonded fabrics, the efficiency is not as high. Nevertheless, as the pressure drop through such fibrous structures will be lower, they may be preferable when high loadings are required.

In order that the fibrous structures described herein can operate with maximum efficiency it is desirable that the flow of oil in water emulsion through the structure is substantially uniform across the structure. Conveniently this can be achieved by passing the emulsion through a suitably shaped and dimensioned sheet or block of an open-cell expanded plastics material located immediately upstream of the fibrous structure.

Apart from serving to distribute the flow substantially across the fibrous structure, the presence of the cellular plastics material on the upstream side of the fibrous structure serves to prevent extraneous matter e.g. solid particles and large oil droplets from entering, and causing blockage in the fibrous structure.

A particularly desirable expanded plastics material for this purpose is a hydrophilic plastics material such as a hydrophilic polyurethane foam.

The fibrous structures used in the invention may have any suitable shape. Though the fibrous structure may be in the form of a sheet or block having substantially planar faces, the fibrous structure may have a tubular form. In the latter case the oil in water emulsion can either by passed from inside to outside or from outside to inside of the fibrous structure. In practice, however, when the fibrous structure is in the form of a tube, we find it more convenient to pass the oil in water emulsion into the inside of the tube and allow it to flow through the wall of the tube. We have found that by adopting this expedient, the oil/water mixture after passing through the fibrous structure tends to adopt a linear flow and this encourages the coalesced oil droplets to separate from the water by gravity.

The method of the present invention can be used with either vegetable or mineral oil emulsions. The method has been found to be particularly effective for achieving coalescence of a variety of both vegetable and mineral oil emulsions for example emulsions from the cleaning of tankers or storage vessels used to transport mineral and vegetable oils, ballast water in crude oil tankers and oil containing coolants.

The invention will now be described with reference to the following Examples

EXAMPLE 1

A point-bonded, melded fabric of 137 gm. per square meter, produced from staple fibres of oriented, i.e. drawn, sheath/core heterofilaments in which the core (50% by weight of total weight of filament) was polyethylene terephthalate of melting point 257° C. and the sheath was a copolymer of polyethylene terephthalate and polyethylene adipate (85:15 mole ratio) of melting point 220° C., was passed through a 2% dispersion of silane-coated silica particles (Silanox 101 manufactured by Cabot Corporation; primary particle size 7 millimicrons; BET surface area 225 $m^2$/gm) in trichloroethylene. The dried fabric was held at constant area on a pin stenter frame whilst being heated at 217° C. for ten minutes, and finally rinsed with water to remove loosely adhering particles. Drops of water placed on the dried fabric had a mean contact angle of 155°.

This fabric was designated Fabric A.

An area-bonded, melded fabric of similar construction was treated in a similar manner. This fabric was designated Fabric B.

A coalescer was produced by forming a four component lay-up by superimposing one piece of Fabric A and three pieces of Fabric B in that order. The fibrous structure so formed was sufficiently strong to allow it to be fixed in position as a common wall between two reservoirs X and Y, the area-bonded face of the structure i.e. Fabric B facing reservoir X and the point-bonded face of the structure i.e. Fabric A facing reservoir Y.

Each reservoir was fitted with a floating arm take-off which could be adjusted so that any oil floating to the surface of the oil/water emulsion in the reservoir could be skimmed off.

Water from the mains was fed by a rotameter into reservoir X. Oil was fed from a barrel directly into the stream of water entering the reservoir and an oil in water emulsion was produced containing 236 ppm of oil. When the reservoir X had filled up, the flow into the reservoir X was adjusted to retain a constant depth of oil/water. The emulsion flowed through the coalescer into reservoir Y until eventually a constant depth of liquid was produced. At this stage, in order to keep a steady state, liquid was drained out of reservoir Y at the same rate as it entered reservoir X. The variation in pressure head across the coalescer was 10.5 cm of water at a constant flow of 9.2 $m^3$ per hour per square meter of fabric.

Initial coalescence of oil droplets on the downstream side of the coalescer was very slow and consisted of very small oil droplets. However, after 3 or 4 hours, coalescence was much faster and the size of the oil droplets formed were much larger and floated towards, and formed a layer on, the free surface of the liquid in reservoir Y.

At this stage, samples of the oil/water emulsion were taken at about 30 minute intervals at a location O within reservoir X immediately on the upstream side of the coalescer and also at a location P within reservoir Y remote from the downstream side of the coalescer after separation of the oil by gravity had occured. With a hydraulic flow of 9.2 $m^3$ per hour per square meter of fabric the liquid leaving the coalescer was allowed to settle for 6 minutes before it arrive at location P. With this hydraulic flow an average oil concentration of 236 ppm (at location O) was reduced to an average of 0.9 ppm (at location P) continuously over a 7 hour period.

The efficiency of the coalescer was then studied with various flow rates with equally good results.

EXAMPLE 2

Example 1 was repeated in entirety (apart from oil concentration and flow rate) except that the coalescer was produced by forming a three component lay-up by superimposing two pieces of Fabric B and one piece of Fabric A. The following results were obtained:

The pressure drop across the coalescer was 26 cm of water. The oil concentration was reduced from 690 ppm (at location O) to 17 ppm (at location P) over a four hour period at a hydraulic flow of 9.8 $m^3$ per hour per square meter of fabric.

EXAMPLE 3

Example 1 was repeated in entirety (apart from oil concentration and flow rate) except that the coalescer was produced by forming a two component lay-up by superimposing two pieces of Fabric B. The following results were obtained:

The pressure drop across the coalescer was 3 cm of water. The oil concentration was reduced from 684 ppm (at location O) to 43 ppm (at location P) over a four hour period at a hydraulic flow of 8 $m^3$ per hour per square meter of fabric.

EXAMPLE 4

Example 1 was repeated in entirety (apart from oil concentration and flow rate) except that the coalescer was a single piece of Fabric A. The following results were obtained:

The pressure drop across the coalescer was 10 cm of water. The oil concentration was reduced from 289 ppm (at location O) to 36 ppm (at location P) over a four hour period at a hydraulic flow of 10.5 $m^3$ per hour per square meter of fabric.

This shows that particularly efficient coalescers are fibrous structures comprising two or more superimposed area-bonded melded fabrics followed by one or more point-bonded melded fabrics as described herein.

EXAMPLE 5

As a comparison, Example 1 was repeated except that the coalescer was produced by forming a four component lay-up by superimposing three pieces of Fabric A (before it had been treated with silane-coated silica particles as described in Example 1) and one piece of Fabric B (before it had been treated with silane-coated silica particles as described in Example 1).

The pressure drop across the coalescer was now 14.5 cm of water. The oil concentration was reduced from 232 ppm (at location O) to 38 ppm over a four hour period (at location P) at a hydraulic flow of 11.6 m$^3$ per hour per square meter of fabric.

This shows that the coalescer used in Example 1 has a much higher efficiency than the coalescer used in the present Example.

EXAMPLE 6

A coalescer was produced by superimposing two pieces of Fabric B. This was fixed in position as a common wall between reservoirs X and Y.

Effluent from the cleaning of road tankers used in the transport of mineral oils and vegetable oils with steam and paraffin based detergents was passed into reservoir X. Liquid was drained out of reservoir Y at the same rate as it entered reservoir X. The variation in pressure head across the coalescer was a maximum of 20 centimeters of water at a constant flow of 16 cubic meters per hour per square meter of fabric.

Samples of the 'oil'/water emulsion were taken at regular intervals at a location O within reservoir X immediately on the upstream side of the coalescer and also at a location P within reservoir Y remote from the downstream side of the coalescer after separation of the 'oil' by gravity had occurred.

The results of separation achieved are given in the table below

| "Oily" Component | Oil Content ppm of Effluent at location O | Oil Content ppm after coalescence at location P |
| --- | --- | --- |
| Palm Oil | 153 | 88 |
| Sunflower Oil/ Spindle/Crude Rape Oil | 36 | 23 |
| Plasticiser | 212 | 115 |
| Lead Naphthalate/ Mineral Oil | 592 | 290 |
| Chrome Liquor/ Mineral Oil | 260 | 168 |

After extended use, the coalescer was successfully cleaned with a jet of steam/hot water and after cleaning was re-used.

We claim:

1. A method for the removal of oil from an oil in water emulsion by passing the emulsion through a fibrous structure and removing the coalesced oil droplets so formed the improvement comprising a fibrous structure comprising fibres having finely divided particles having an average size of one micron or less and which exhibit oleophilic and hydrophobic properties adhered to and penetrating their outer surfaces.

2. A method as in claim 1 wherein said fibres are conjugate fibres having at least two components of which one has a melting point lower than that of the other, said particles having been adhered to and penetrated into the lower melting point component by heat-softening the latter.

3. A method as in claim 2 wherein said fibre components are in a sheath-core arrangement with the lower melting point component forming the sheath.

4. A method as in claim 2 wherein the difference in melting points of said fibre components is at least 10° C.

5. A method as in claim 1 wherein said particles comprise silane-coated silica particles.

* * * * *